July 7, 1953  T. T. CAGLE  2,644,549
BRAKE DISK WEAR COMPENSATING AND INDICATING MEANS
Filed May 4, 1950
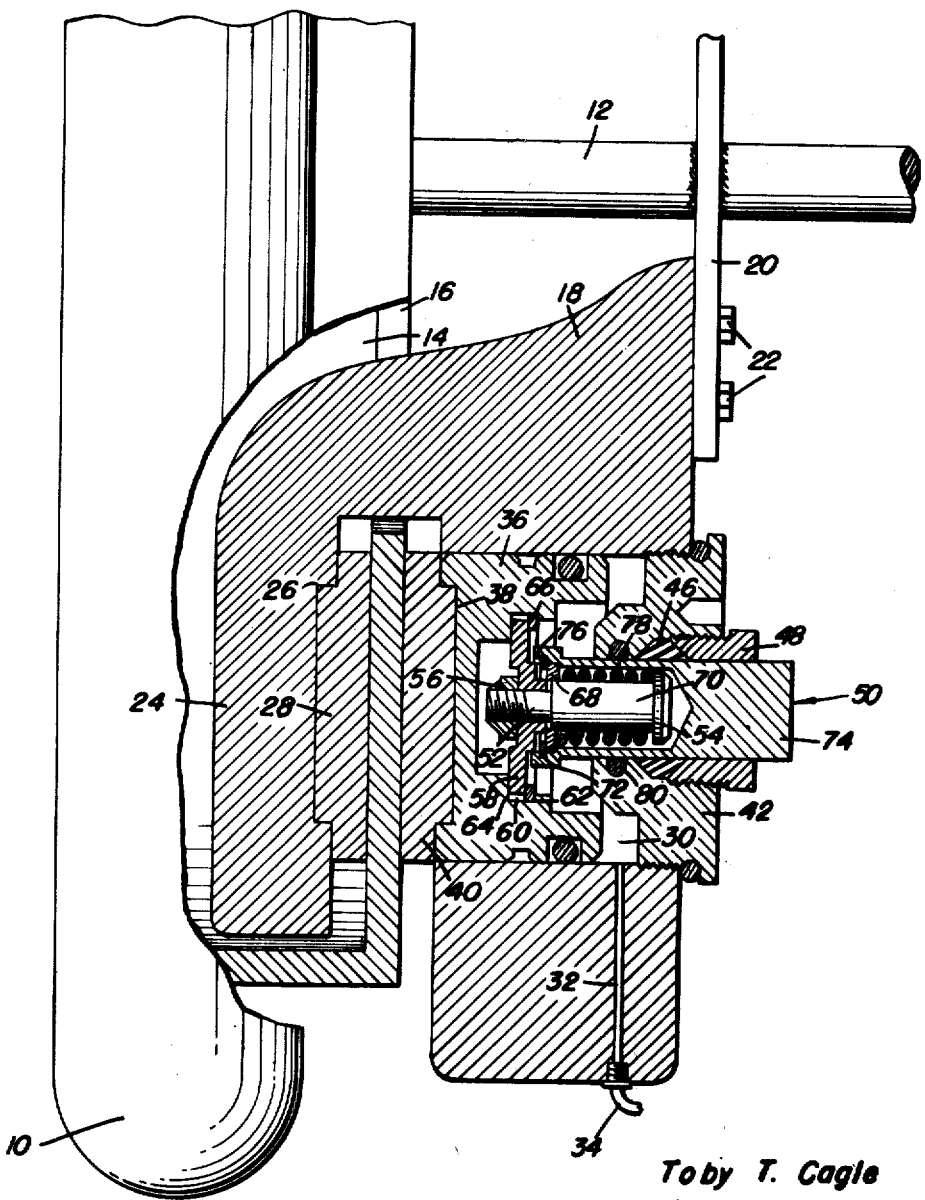
Toby T. Cagle
INVENTOR.

Patented July 7, 1953

2,644,549

UNITED STATES PATENT OFFICE 2,644,549

BRAKE DISK WEAR COMPENSATING AND INDICATING MEANS

Toby T. Cagle, Long Beach, Calif., assignor to Airheart Products, Inc., Long Beach, Calif., a corporation of California Application May 4, 1950, Serial No. 160,025

3 Claims. (Cl. 188—152)

1

This invention relates to brake structures for vehicles and more particularly to an improvement on the automatically adjustable releasing means for upright assembly as disclosed in the copending application, Serial No. 136,013, filed December 30, 1949.

An object of this invention is to provide a means to automatically take up the clearance between a brake drum and the brake element in response to the wear of the element by the action of a combined spring return means for a piston which operates the brake element and an adjustable holding device which presses upon the indicating means which, in turn, opposes both the inward and outward movement of the piston.

Another object of the present invention resides in the provision of a sealing means for preventing contact of the hydraulic fluid in the pressure chamber from contacting the compression seal of the holding device for the indicating means.

These, together with the various ancillary objects and features of the invention which will become apparent as the following description proceeds, are attained by this automatically adjustable releasing means for brake assemblies, a preferred embodiment of which has been illustrated in the accompanying drawing, by way of example only, wherein:

The figure is an elevational view of part of the vehicle wheel showing the brake assembly in operative emplacement with parts thereof being shown in section for greater detail.

With continuing reference to the accompanying drawing, the reference numeral 10 generally designates the wheel of an aircraft or like vehicle. Obviously, the instant device may be employed with any type of vehicle or in any environment where a rotating member has to be stopped periodically. While the illustrated form of the invention has been shown for use with an aircraft wheel, obviously such can be used with any other vehicle or the like. The wheel 10 is journaled on an axle 12 and is provided with a brake drum 14 which includes a peripheral flange 16 extending inwardly thereof.

A cylinder block 18 is disposed adjacent the drum 14 and has means for supporting it at that point comprising a hanger 20 which is welded or otherwise secured to the axle 12 and which is bolted as at 22 to the cylinder block 18.

A backing plate 24 which forms part of the cylinder block 18 is disposed in the brake drum 14 and has a recess 26 therein. The recess 26 accommodates an appropriately shaped end portion of a stationary brake element 28 which is

2 carried thereby and which is adapted to engage the flange 16.

Formed in the cylinder block 18 is a cylindrical opening 30 serving as a fluid chamber. This chamber has a fluid passage 32 communicating therewith which is adapted to permit passage of the hydraulic fluid received from the conduit 34. The fluid is supplied through the conduit 34 from any conventional mechanism which is adapted to introduce fluid under pressure into the chamber 30.

A piston 36 having a recess 38 in the head thereof is slidably disposed in the chamber 30. There is provided a movable brake element 40 carried within the recess 38 in the piston 36.

The outer end of the cylinder block 18 is internally threaded in order to receive the hollow nut 42. The hollow nut is provided with a tapered opening therein for accommodating the resilient and flexible seal 46. This seal is held in place and compressed a desired amount by means of a jamb nut 48 which is threaded in an opening in the hollow nut 42. An indicating means which is generally indicated at 50 is secured to the piston by means of a stud 52 having a head 54. A nut 56 is provided for holding the stud 52 fixed to a disk 58 which is held in place in a recess 60 formed by outer and inner shoulders 62 and 64, respectively, by the ring 66. The ring 66 is engaged by the shoulder 62 and the disk 58 on its opposite side.

Formed on the stud 52 is a body portion 70 of enlarged diameter. The indicator means 50 including the indicator element 74 is held in position on the stud 52 by means of a ring 72. The ring 72 is mounted in the inner end of the indicator element 74 by an annular flange 76 which forms a retaining shoulder for ring 72. The ring 72 retains the collar 68 against a shoulder in the indicator element 74.

A return spring 78 is disposed in the indicator element 74 concentric with the portion 70 of the stud 52 and biases the head 54 and the collar 68, thus continuously urging the stud 52 into the recess of the indicator element 74.

In order to prevent fluid which is introduced into the chamber 30 from coming in contact with the seal 46, a packing seal 80 is provided in the hollow nut 42 for engagement with the indicator element 74.

In operation, fluid under pressure is applied into the chamber 30 through the conduit 34. The pressure in the chamber 30 urges the piston 36 inwardly of the cylinder block to cause the brake elements 28 and 40 to firmly engage the flange 16 of the drum 14. As piston 36 moves into engagement with flange 16, it carries with it parts 58, 52, 54 and 70. Collar 68, mounted on the indicator element 74, remains stationary, since seal 46 frictionally engages 74 with a greater force than that initially exerted by spring 78 against collar 68. As brake element 40 is worn, piston 36 must travel further and head 54 of stud 52, which is carried by piston 36 causes spring 78 to be compressed to a greater degree. Eventually, the compressive force of spring 78 overcomes the frictional force of seal 46, and indicator element 74 is drawn in, indicating thereby the degree of wear of the brake element 40.

Since, from the foregoing, the construction and advantages of this automatically adjustable releasing means for brake assemblies is readily apparent, further description is believed to be unnecessary. However, since numerous modifications will readily occur to those skilled in the art after a consideration of the foregoing specification and accompanying drawings, it is not intended to limit the invention to the precise embodiment shown and described, but all suitable modifications and equivalents may be resorted to which fall within the scope of the appended claims.

Having described the invention, what is claimed as new is:

1. For use with a wheel assembly which includes a brake drum, a brake assembly comprising a cylinder block, a piston disposed in said cylinder block, a piston disposed in said cylinder block, means connected to said block for supporting said block adjacent the brake drum, a stationary brake element supported by said block adjacent said drum, a movable brake element carried by said piston and arranged to engage said drum, an indicating means, spring return means concentric with and carried by said indicating means, inner and outer shoulders formed on said piston, a retainer disk connected to said indicating means, a ring holding said disk in engagement with said inner shoulder of said piston, said locking ring engaging said outer shoulder, and a holding device engaging said indicating means arranged to oppose movement of the indicating means toward the brake element and to prevent free return of said indicating means dependent upon the return force of the spring return means.

2. For use with a wheel assembly which includes a brake drum, a brake assembly comprising a cylinder block, a piston disposed in said cylinder block, means connected to said block for supporting said block adjacent the brake drum, a stationary brake element supported by said block adjacent said drum, a movable brake element carried by said piston and arranged to engage said drum, an indicating means, spring return means concentric with and carried by said indicating means, inner and outer shoulders formed on said piston, a retainer disk connected to said indicating means, a locking ring holding said disk in engagement with said inner shoulder of said piston, said locking ring engaging said outer shoulder, and a holding device engaging said indicating means arranged to oppose movement of the indicating means toward the brake element and to prevent free return of said indicating means dependent upon the return force of the spring return means, said device comprising a resilient seal engaging said indicating means, and adjustable means pressing said seal against said indicating means.

3. For use with a wheel assembly which includes a brake drum, a brake assembly comprising a cylinder block, a piston disposed in said cylinder block, means connected to said block for supporting said block adjacent the brake drum, a stationary brake element supported by said block adjacent said drum, a movable brake element carried by said piston and arranged to engage said drum, an indicating means, spring return means concentric with and carried by said indicating means, inner and outer shoulders formed on said piston, a retainer disk connected to said indicating means, a locking ring holding said disk in engagement with said inner shoulder of said piston, said locking ring engaging said outer shoulder, and a holding device engaging said indicating means arranged to oppose movement of the indicating means toward the brake element and to prevent free return of said indicating means dependent upon the return force of the spring return means, said device comprising a resilient seal engaging said indicating means, and adjustable means pressing said seal against said indicating means, said adjustable means comprising a hollow nut secured to said block, said seal being secured in said hollow nut, a jamb nut threadedly engaged in said hollow nut in engagement with said seal for adjusting the compression of said seal, and another seal carried by said hollow nut engaging said indicating means.

TOBY T. CAGLE.

References Cited in the file of this patent
UNITED STATES PATENTS

| Number | Name | Date |
| --- | --- | --- |
| 2,384,297 | Goepfrich | Sept. 4, 1945 |
| 2,392,970 | Bricker | Jan. 15, 1946 |
| 2,485,086 | Cagle | Oct. 18, 1949 |

UNITED STATES PATENT OFFICE
CERTIFICATE OF CORRECTION

Patent No. 2,644,549　　　　　　　　　　　　　　　July 7, 1953

Toby T. Cagle

It is hereby certified that error appears in the above numbered patent requiring correction and that the said Letters Patent should read as corrected below.

Column 3, lines 34 and 35, strike out "a piston disposed in said cylinder block,".

Signed and sealed this 13th day of November 1962.

SEAL)
Attest:

ERNEST W. SWIDER
Attesting Officer

DAVID L. LADD
Commissioner of Patents